(12) United States Patent
Carisella

(10) Patent No.: US 6,374,917 B2
(45) Date of Patent: Apr. 23, 2002

(54) INFLATION ELEMENT FOR A DOWNHOLE TOOL HAVING A PRE-DISPOSED BLADDER AND/OR COVER, AND METHOD SHAPING TOOL FOR PRE-DISPOSING THE BLADDER AND/OR COVER

(76) Inventor: James V. Carisella, 1204 Distributors Row, Harahan, LA (US) 70123

( * ) Notice: Subject to any disclaimer, the term of this patent is extended or adjusted under 35 U.S.C. 154(b) by 0 days.

(21) Appl. No.: 09/847,704

(22) Filed: May 2, 2001

Related U.S. Application Data (63) Continuation of application No. 09/291,896, filed on Apr. 14, 1999, now abandoned.

(51) Int. Cl.[7] .............................................. E21B 33/127
(52) U.S. Cl. ........................................ 166/378; 166/120
(58) Field of Search .......................... 299/21; 166/120, 166/187, 378, 380

(56) References Cited

U.S. PATENT DOCUMENTS

| | | | | |
|---|---|---|---|---|
| 4,744,421 A | * | 5/1988 | Wood et al. ................. | 166/387 |
| 5,236,201 A | * | 8/1993 | Vance, Sr. et al. ............ | 277/34 |
| 5,340,626 A | * | 8/1994 | Head .......................... | 428/36.9 |
| 5,507,341 A | * | 4/1996 | Eslinger et al. .............. | 166/187 |

* cited by examiner

Primary Examiner—David Bagnell
Assistant Examiner—Jennifer R. Dougherty
(74) Attorney, Agent, or Firm—Fulbright & Jaworski L.L.P.

(57) ABSTRACT

A downhole tool includes an improved expandable, elastomeric component having a pre-disposed expansion profile. The expansion profile is pre-disposed by surrounding at least a portion of the elastomeric component with a shaping tool having an inner diameter that defines a profiled limit. Fluid under pressure is applied to the elastomeric component for expanding it into contact with the inner diameter of the shaping tool. The pressure of the fluid may be reduced to allow the elastomeric component to return generally to its original shape.

30 Claims, 6 Drawing Sheets

INFLATION ELEMENT FOR A DOWNHOLE TOOL HAVING A PRE-DISPOSED BLADDER AND/OR COVER, AND METHOD SHAPING TOOL FOR PRE-DISPOSING THE BLADDER AND/OR COVER

This application is a continuation of application Ser. No. 09/291,896 filed Apr. 14, 1999, now abandoned.

FIELD OF THE INVENTION

This invention relates to inflation elements for use in downhole well tools and, more particularly, to such an element and a method and mold for making the bladder and/or cover portions of such elements where the elastomeric material used to form the bladder and/or cover is processed to impart improved performance characteristics by pre-disposing directional properties via stretching and expansion operations before the tool is run in service.

BACKGROUND OF THE INVENTION

Downhole inflatable tools such as packers, bridge plugs and the like, have been utilized in subterranean wells for many years. Such tools normally include an inflation element that includes an elastomeric bladder concentrically disposed around a central body portion such as a tube or mandrel. A sheath of axially oriented reinforcing slats or ribs is typically disposed around the bladder. One or more elastomeric cover or seal sections are concentrically disposed around at least a portion of the ribs. Reinforcing structures other than slats and ribs are also common among such tools. Fluid under pressure is introduced from the top of the well or from the interior of the well bore into the central body and through radial passages, or around the exterior body to the interior of the bladder, to cause the bladder and, consequentially, the element to expand. The subject invention is applicable to all known downhole inflatable tools that include a bladder and/or one or more covers.

Typically, the upper ends of the inflatable bladder and ribs are secured relative to the body, while the lower ends of the bladder and reinforcing sheath are secured to a seal which is movable relative to the body. The movable seal responds to inflation forces and allows the inflation element to expand without causing damage to any of its component parts.

For inflation elements of this type, the exposed sections of the reinforcing slats or ribs typically operate as anchor sections, while the elastomeric cover elements typically operate as seals. The anchor section(s) and cover element(s) expand until they engage the wall of the well bore to isolate sections of the well bore on opposite sides of the tool from each other.

Ideally, inflation elements should first expand in the center and then uniformly propagate outwardly in both directions so that fluid is not trapped between the outer surface of the element and the well bore. In addition, the outward expansion should be controlled to prevent relatively steep slopes from occurring in the profile of the bladder during inflation. A steep slope in the profile can cause the bladder to stretch in the axial direction and result in unwanted conditions.

Axial stretching of the bladder during inflation can create two deleterious conditions, 1) localized tri-axial strains in the bladder and 2) pinching seals with related folds in the bladder. Alone, either one of these conditions can cause bladder failure. The presence of both conditions is almost certain to cause failure. Failures occur because the physical properties of the elastomeric material composing the bladder are not adequate to survive service conditions, i.e., highly localized tri-axial strains, high fluid pressure pressing the bladder against the edges of the ribs, elevated temperatures, chemically active (sometimes aggressive) inflation and treatment fluids, etc.

Figure 3:
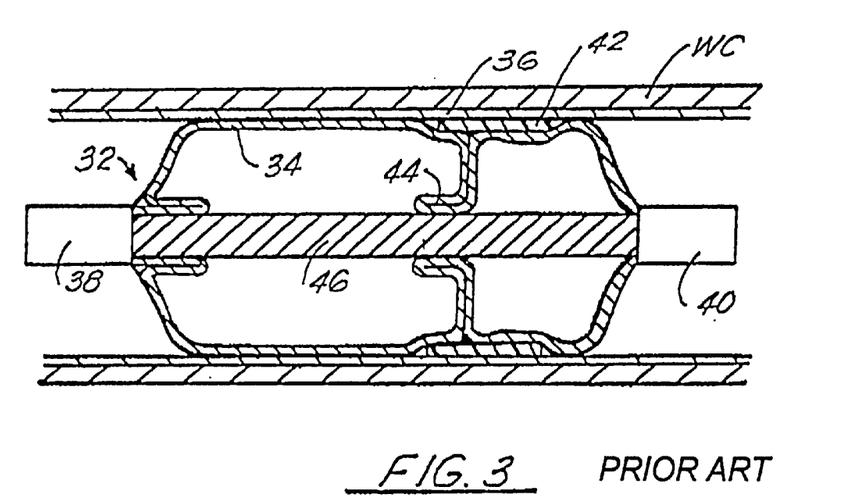
FIG. 3 is an illustrative schematic view of a bladder being pinched to illustrate the problem solved by the invention.

These problems are discussed in an article entitled "Design and Testing of a High-Performance Inflatable Packer," D. M. Eslinger and H. S. Kohli, SPE Pub. 37483 (1997). FIG. 3 of that article is reproduced as FIG. 3 of the appended drawings to illustrate the pinching and folding problem. Although several solutions were suggested in the article, including the use of specially developed elastomers, slats in the carcass with specific structural features and software to aid in the design and execution of specific jobs, the problems of folds and bladder failure still remain.

Bladder failure was also discussed in my U.S. Pat. No. 5,495,892, which recognized conditions where the bladder tends to pinch and form a seal on the mandrel (central body) during inflation and obstruct the passage of pressurized fluid. The obstruction problem was solved by providing a concentric tube between the outside of the mandrel and the bladder to facilitate fluid communication along the entire length of the bladder regardless of the presence of pinching seals. However, the concentric tube did not eliminate of the formation of folds and the occurrence of other phenomena that cause bladder failures.

Three other patents of mine, U.S. Pat. Nos. 5,469,919, 5,564,504 and 5,813,459, also discuss pinching seals, bladder folding, rib kinking, and rib cutting of the bladder. These patents describe the use of structural elements along the length of the bladder to cause relatively uniform expansion such that the ratio of the largest diameter of the bladder to the smallest diameter during inflation is always below a pre-determined maximum value. However, although the designs in these patents resulted in elements with more uniform expansion, they did not completely eliminate the occurrence of folds, rib kinking, rib cutting or the occurrence of high tri-axial strains in the bladder.

Another problem caused by folds is that they remain when the bladder is deflated. This causes difficulty when the tool is to be retrieved because the bladder cannot deflate to a size that is equal to or smaller than its original run-in size and the tool might not be retrievable. This problem would eliminate the use of relatively low cost thru-tubing inflatable tools from a great many service jobs, and possibly necessitate an expensive "rig job", i.e., such as pulling tubing and requiring other expensive support operations.

In addition, a pinching seal can cause an inflation element to inflate only partially, leaving a significant portion of the element not inflated. At the surface, the tool is thought to be completely inflated and surface operations are continued. However, the pinched seal loses its seal within minutes after inflation operations are terminated. This results in loss of inflation pressure, loss of seal between the inflation element and the well bore, loss of anchor between the inflation element and the well bore and failure of the well tool. This type of failure falls under the general category of a "soft set failure".

SUMMARY OF THE INVENTION

The present invention is directed to a method for solving the problems discussed above, a shaping tool or vessel for use in the method, and a downhole tool with a bladder and/or cover sections that are pre-disposed in accordance with the method, where the bladder and/or cover sections have improved inflation characteristics and their elastomeric components have improved physical properties.

Pre-disposing elastomeric components means to better align the long axes of the molecular chains of the elastomer in a direction transverse to the long axis of the tool before the tool is run downhole so that the inflation profiles of the inflation element during inflation are improved and the physical properties of the elastomeric material composing the bladder and/or covers are improved and impart enhanced integrity of the bladder and/or covers in service.

The preferred method of pre-disposing (i.e., stretching) elastomeric components (bladders and covers) is by inflating the components within a shaping tool or vessel having a deliberate interior profile. The interior profile imparts different magnitudes of expansion along the length of the elastomeric component. Pre-disposing of an inflation element in an optimally designed vessel will facilitate improved expansion profiles throughout inflation of the well tool and will abate the formation of pinching seals and folds in the inflation element. Additionally, pre-disposing elastomeric components increases the tear resistance of the elastomer and thereby, increases the tolerance of bladders to rib kinking, rib cutting and folds.

When an elastomeric component such as a bladder or cover section is stretched via inflation, its long molecular chains slide over one another and tend to rotate and translate to become more aligned with the direction of maximum principal strain, i.e., the circumferential direction in the plane normal to the longitudinal axis of the tool. When the component is unloaded (deflated) and allowed to recover, the molecular chains tend to move back toward their original spacial locations and orientations, but do not return entirely back to their original spacial locations. Generally, they return to an intermediate position somewhere between their initial location and the location at the peak of their stretch.

If the elastomeric component is stretched again in the same fashion, the resistance to stretching is less than it was during the first stretching because the molecular chains have already traveled over the same route and their movement is relatively unobstructed. Thus, it can be said that the first stretching produces a pre-disposition in the elastomeric material toward stretching it in the same direction and in the same fashion as had previously been done. This means that the molecular chains in the elastomeric material in their new pre-disposed locations have their long axes more aligned with the direction of the maximum principal strain, which is the direction of stretching.

Thus, when a bladder is inflated in diameter and there is no change in its length, the maximum principal strain is in the circumferential direction in the plane normal to its longitudinal axis. A bladder can therefore be pre-disposed by inflating it in a cylindrical mold. It can then be allowed to deflate and recover to its original size and shape. It can then be installed in an inflation element, or it could be pre-disposed after it is installed in the element. It has been found that when a bladder is pre-disposed in this manner the tear resistance is substantially increased when compared with the tear resistance of a bladder that is not predisposed.

Favorable alignment of the molecular chains are further enhanced if the raw elastomer is processed by calendering it through rollers before it is formed into a bladder or cover. This procedure imparts a strong degree of molecular alignment in the elastomer. This can be been done by forming the elastomer into a thin elongated sheet, wrapping the sheet onto a cardboard mandrel and then slicing the sheet into narrow ribbons approximately 3"-6" wide. Calendering to acquire a ribbon form to produce a bladder is well known to those skilled in the art. However, calendering to acquire molecular alignment and enhanced physical properties is believed not to be known.

Calendering aligns the long axes of the molecular chains with the long axis of the ribbon before forming it into a bladder. The calendered ribbon is then wrapped onto a mandrel so that the long axis of the ribbon is aligned circumferentially around the bladder or cover, that is, the longitudinal axis of the bladder or cover is transverse to the long axes of the molecular chains.

Pre-disposition of elastomeric components and/or subassemblies such as inflation elements can be accomplished by surrounding the component and/or element with a tool having an inner diameter that defines a profiled expansion limit. Fluid is then supplied under pressure for expanding the component and/or element into contact with the inner diameter to impart the pre-disposition. The component is then deflated so it returns generally to its original shape. A component and/or element can be subjected to multiple inflation/deflation cycles.

Because elastomers are inelastic in nature, the component and/or element is kept inflated for a predetermined lapse of time to allow the time-dependent response of the molecular chains to be fully realized. Correspondingly, the magnitude of the stretching, the rate of stretching, the inside contour of the shaping tool, dwell times, the temperature at which the stretching process is performed and the number of stretching cycles performed on a component are all inter-related and can effect the magnitude of pre-disposition and enhancement.

In one embodiment, the shaping tool includes a sleeve that is concentrically positioned to surround the expandable component. The inner diameter of the shaping tool is formed by inserting a pair of structural parts called end caps between the component(s) and sleeve. The end caps define a smooth tapering surface that decreases in diameter from near the center of the tool toward both ends.

Preferably, the inner diameter of the tool has a cylindrical section in the middle, with truncated conical sections at both ends. However, if the expandable component is designed so that it tends to expand initially at the upper end, the truncated conical section at the upper end can be shorter than the one at the lower end, with the cylindrical center section being located closer to the upper end of the shaping tool. The tool can be customized in other ways to impart favorable pre-disposed properties in components having unique physical shapes.

In another embodiment, the cylindrical center section is eliminated, with the inner diameter of the tool being formed of a pair of abutting truncated conical sections with their bases in contact with each other. Other suitable shapes can be used, depending on the pre-disposed profile desired.

This pre-disposition is preferably done at ambient temperature before the downhole tool is run in the well bore.

BRIEF DESCRIPTION OF THE DRAWINGS

A better understanding of the invention can be obtained when a detailed description of preferred embodiments set forth below is considered in conjunction with the appended drawings, in which.

DETAILED DESCRIPTION OF PREFERRED EMBODIMENTS

The details and advantages of the invention will be understood from the following detailed description. The invention generally relates to improved expandable, elastomeric components for an inflation element of a downhole tool, such as bladders and cover sections, which have pre-disposed expansion profiles and enhanced physical properties, and a method for pre-disposing the expansion profiles of such components, and a shaping tool or vessel for use in the method.

Figure 1:
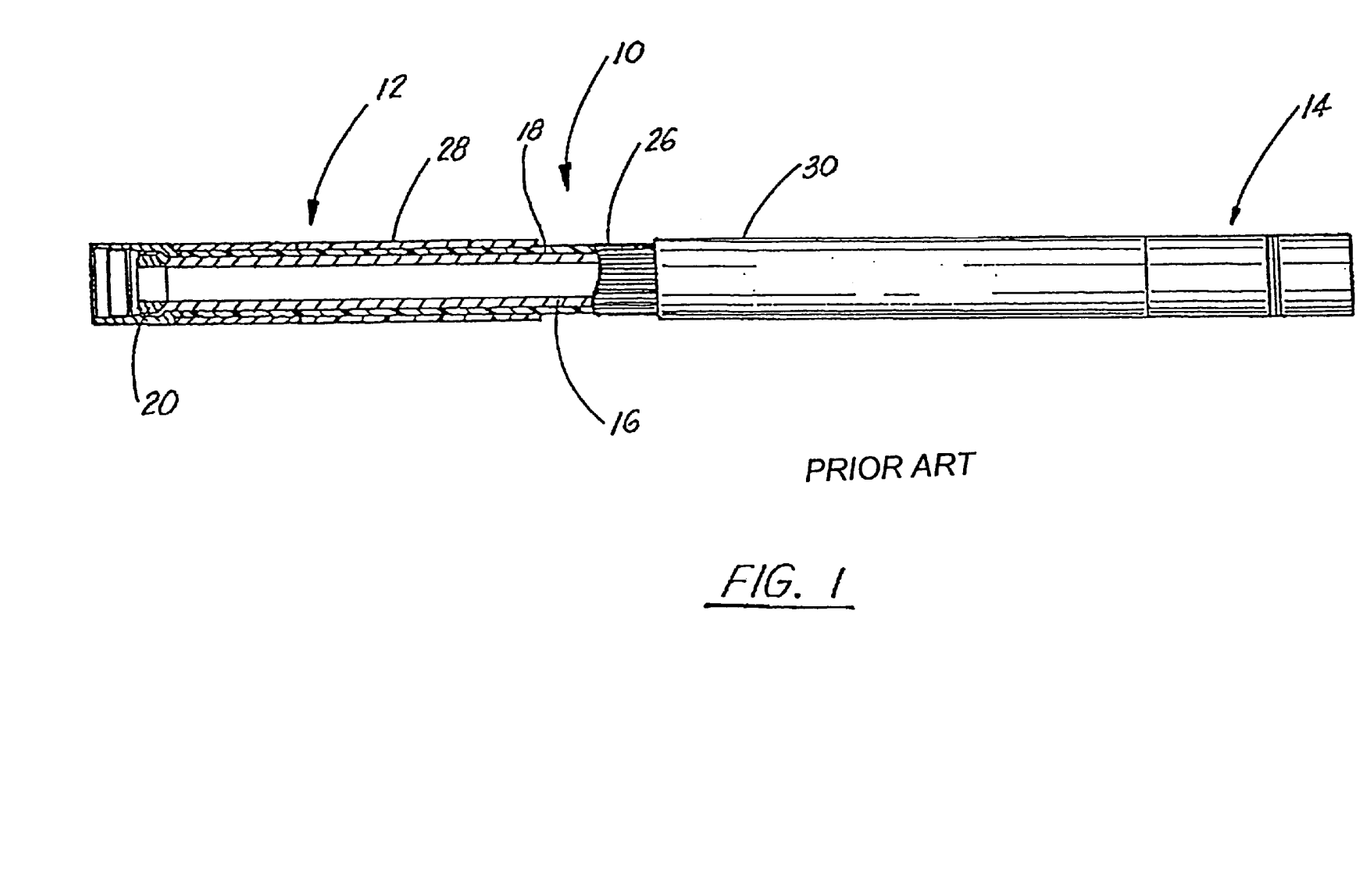
FIG. 1 is a plan view, partially in section, of an inflation element of a downhole tool which has an exposed rib anchor section and elastomeric cover elements on both sides of the exposed ribs.
Figure 2:
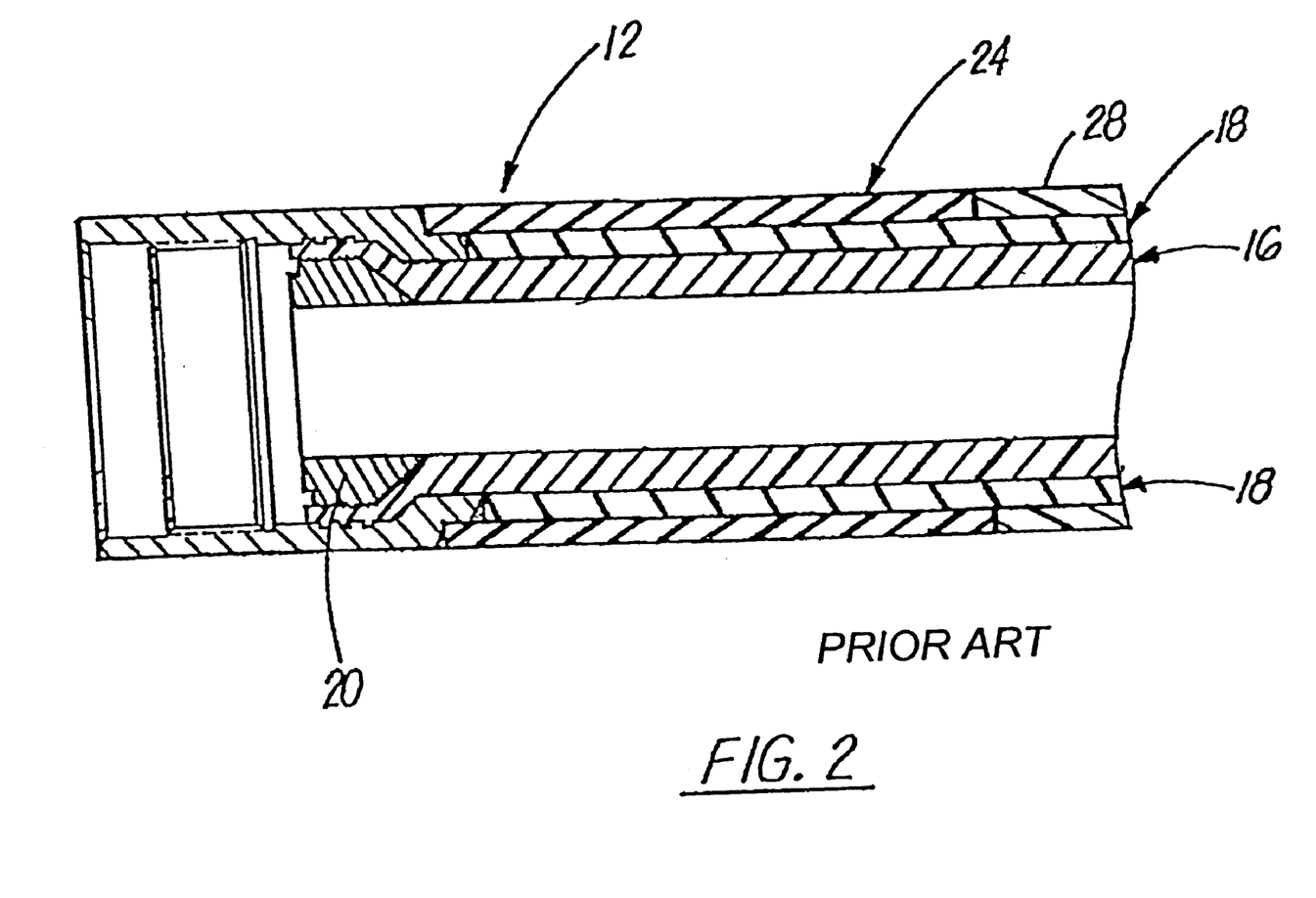
FIG. 2 is a sectional view of a portion of the element shown in FIG. 1, which shows the relationship of the bladder to the ribs and cover section.

Before describing preferred embodiments of the invention in detail, reference should be had to FIGS. 1 and 2, which illustrate a known type of inflation element 10, to which the invention can be applied. However, the invention can be applied to inflation elements having a wide variety of shapes and sizes that are different from those exhibited in FIGS. 1 and 2. The inflation element 10 can used in tools such as a packer, bridge plug, tubing hanger, cement retainer, or the like, depending upon the desired application.

The inflation element 10 includes upper and lower end collars 12, 14, respectively. A bladder 16, formed of an expandable, elastomeric material, extends between the end collars 12, 14. The bladder 16 is expanded and contracted through the introduction and withdrawal of pressurized fluid in a way that is well known.

The bladder 16 is surrounded by and secured to a reinforcing sheath formed of a plurality of longitudinally extending slats or ribs 18, which are also well known. Each of the ribs 18 overlaps the next adjacent rib when the bladder 16 is deflated. Each rib also adequately overlaps the next adjacent rib when the bladder 16 is inflated forming a protective structural sheath over the bladder 16. Exposed sections of the ribs 18 also operate to anchor the tool in a well bore.

The ends of the bladder 16 are held in place in the end collars 12, 14, by means of a grip ring 20. Referring to the upper end of the inflation element 10, the ends of the ribs 18 are held between the bladder 16 and an extension transition sleeve 24, which is part of the end collar 12. Typically, when the bladder 16 expands the lower end connection is configured to move relative to the tool on which the inflation element 10 is mounted so that the bladder 16 and ribs 18 expand outwardly without fear of being damaged.

The inflation element 10 includes an exposed rib section 26 and cover sections 28, 30, formed of expandable, elastomeric material, mounted on the ribs 18. The cover sections 28, 30, extend between the exposed rib section 26 and the end collars 12, 14, respectively. The inflation element 10 can include one or more exposed rib sections along its length, or even be formed with no exposed rib sections where the ribs 18 are totally covered by an elastomeric cover.

In the embodiment of the tool 10 shown in FIG. 1, the elastomeric cover sections 28, 30, have a uniform diameter and thickness along their length. However, in other embodiments the cover sections can be profiled in that they are formed of varying thicknesses, or they can be shaped in other ways, to influence the expansion characteristics of the inflation element.

One of the problems encountered by an inflation element 10 when it is expanded downhole is caused by localized tri-axial strains in the bladder, which is illustrated in FIG. 3 of the Eslinger and Kohli article cited above, reproduced as FIG. 3 of the drawings. In that drawing, the inflation element 32 has been expanded inside a well casing WC. The inflation element 32 includes a bladder 34 and overlapping ribs 36 extending between end collars 38 and 40. In this embodiment of an inflation element, a single elastomeric cover section 42 is mounted on the ribs 36. As the bladder 34 expands, a portion 44 of the bladder 34 folds and is pinched against a mandrel 46 that extends through the center of the element 32. As discussed above, this pinching problem can cause bladder failure and prevent the element 32 from decompressing when the bladder is deflated.

This and other problems discussed above have been solved by pre-disposing the bladder 34 prior to inflation for aligning the long axis of the molecular chains that make up the elastomer from which the bladder is formed, as discussed above. One aspect of pre-disposing the bladder includes the process of forming the bladder.

One way bladders have been formed in the prior art is by extruding the elastomer used to form the bladder into a shape suitable for the bladder. This method has proved to be unsatisfactory in forming a bladder that is resistant to tearing because the molecular chains of the elastomer are aligned with the long axis of the inflation element. As discussed above, the chains are not aligned in the direction of principal strain, which results in a bladder that is less resistant to the propagation of tears in the longitudinal direction of the bladder. Thus, the bladder should be formed by wrapping strips of elastomer around a mandrel that is either cylindrical or shaped in way that influences the inflation profile of the bladder.

However, before the bladder is formed, the elastomer is preferably calendered in a known way in order to improve the directional tear strength of the elastomer. The calendered elastomer is preferably formed into strips that are 4" wide and from 0.40"–0.50" thick, but other thicknesses can be used. Although there are many suitable elastomers, a nitrile polymer (NBR) is preferable.

Figure 4:
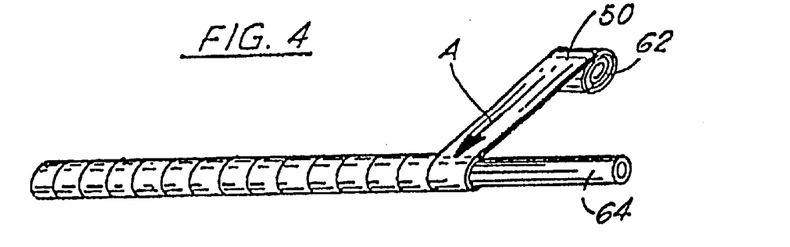
FIG. 4 is a schematic view of a thin strip of elastomeric material being wrapped onto a mandrel to form a bladder or cover section.
Figure 5:
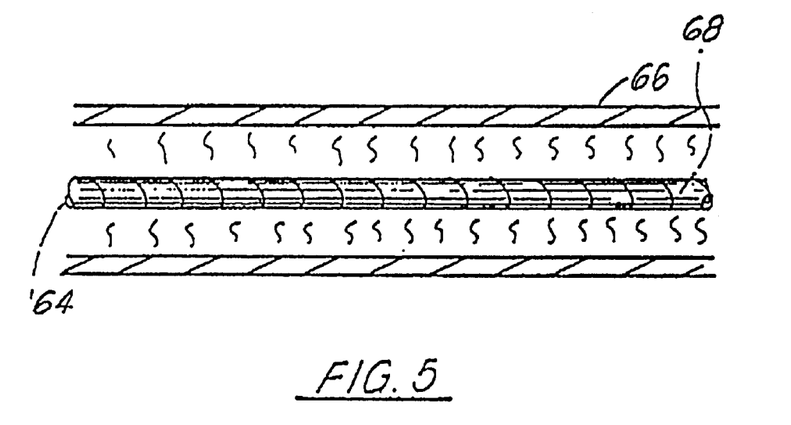
FIG. 5 is a schematic view, partially in section, of a bladder or cover section formed as shown in FIG. 4, being cured in an oven.

The preferred method for forming a bladder or cover section is shown in FIG. 4, where a strip 62 of the elastomer 50 is wrapped onto a mandrel 64 in the direction of arrow A. The strip should be wrapped in a spiral so that it will overlap about 50% of the portion of the strip that is already wrapped. The strip 62 is wrapped back-and-forth along the mandrel 64 in this manner until a suitable thickness is achieved. This can be done with four or more layers of the elastomer wrapped on the mandrel 64. The elastomer is then cured in an autoclave 66, shown schematically in FIG. 5, in a known way. After it is cured, the elastomeric component 68 is removed from the mandrel 64 (not shown).

In order to further pre-dispose the component 68, it is mounted on a holding tool 70 and connected to a source of pressurized fluid (not shown). The expandable elastomeric component 68 is then inserted into and held in place in a shaping tool or vessel 72. The tool shown in FIG. 6 includes a cylindrical sleeve 73 and a pair of end caps 74, 76, which are locked in place by any suitable type of holding or clamping mechanism. The inner surfaces of the sleeve 73 and the end caps 74, 76, define the profiled expansion limit for the component 68 when fluid is introduced into the component and it is expanded in the direction of arrows 78a and 78b as shown by the dotted lines in FIG. 7. The fluid can be applied either continuously or intermittently. The expansion profile in the vessel 72 is generally defined by the shape of the component when it is expanded downhole, but other shapes and configurations can be used to advantage for pre-disposing the component 68.

Figure 6:
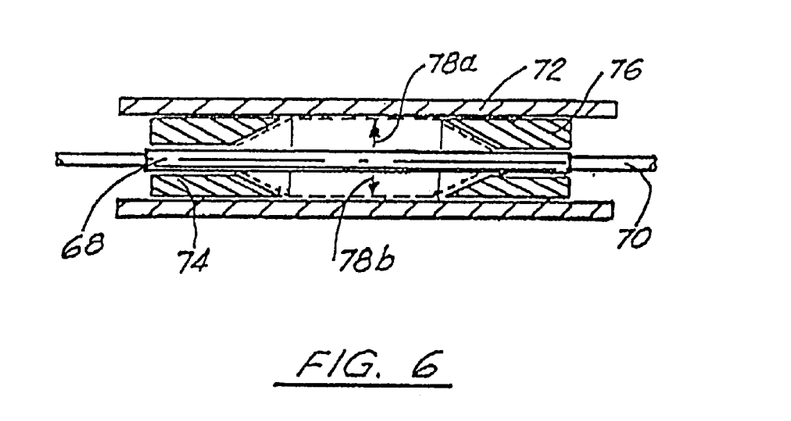
FIG. 6 is a plan view, partially in section, showing a bladder or cover section being predisposed in one embodiment of a shaping tool or vessel.
Figure 7:
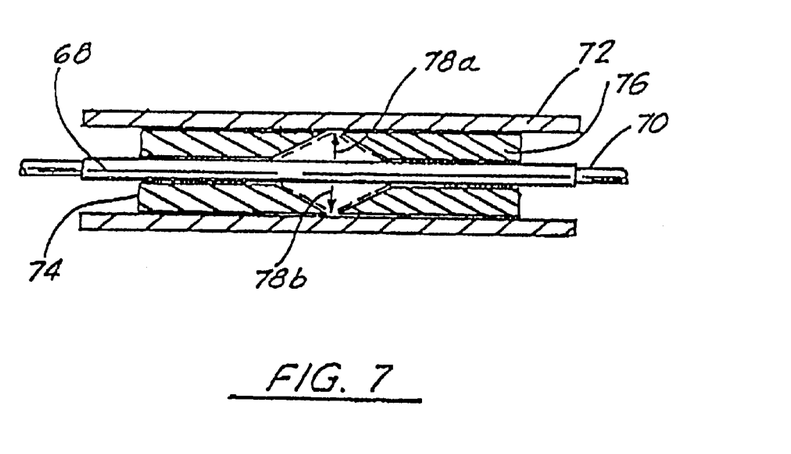
FIG. 7 is a plan view, partially in section, showing a bladder or cover section being predisposed in another embodiment of a shaping tool.

An alternative expansion profile is shown in FIG. 7, where the vessel 72 does not have a center cylindrical sleeve as shown in FIG. 6, but has the form of two truncated conical sections abutting each other as defined by the inner surfaces of the end caps 74, 76. The pre-disposed expansion profile is defined by the inner surfaces of the end caps 74, 76, as shown in FIG. 7.

By pre-disposing the bladder as shown, the elastomer from which the bladder is formed is strengthened and will tend to expand without creating folds of the type shown in FIG. 3. This, in turn, will increase the service reliability of the tool by preventing uneven expansion and the problems discussed above. Alternatively, cover sections could be pre-disposed in a similar manner with a desired profile before they are installed onto an inflation element.

Figure 8:
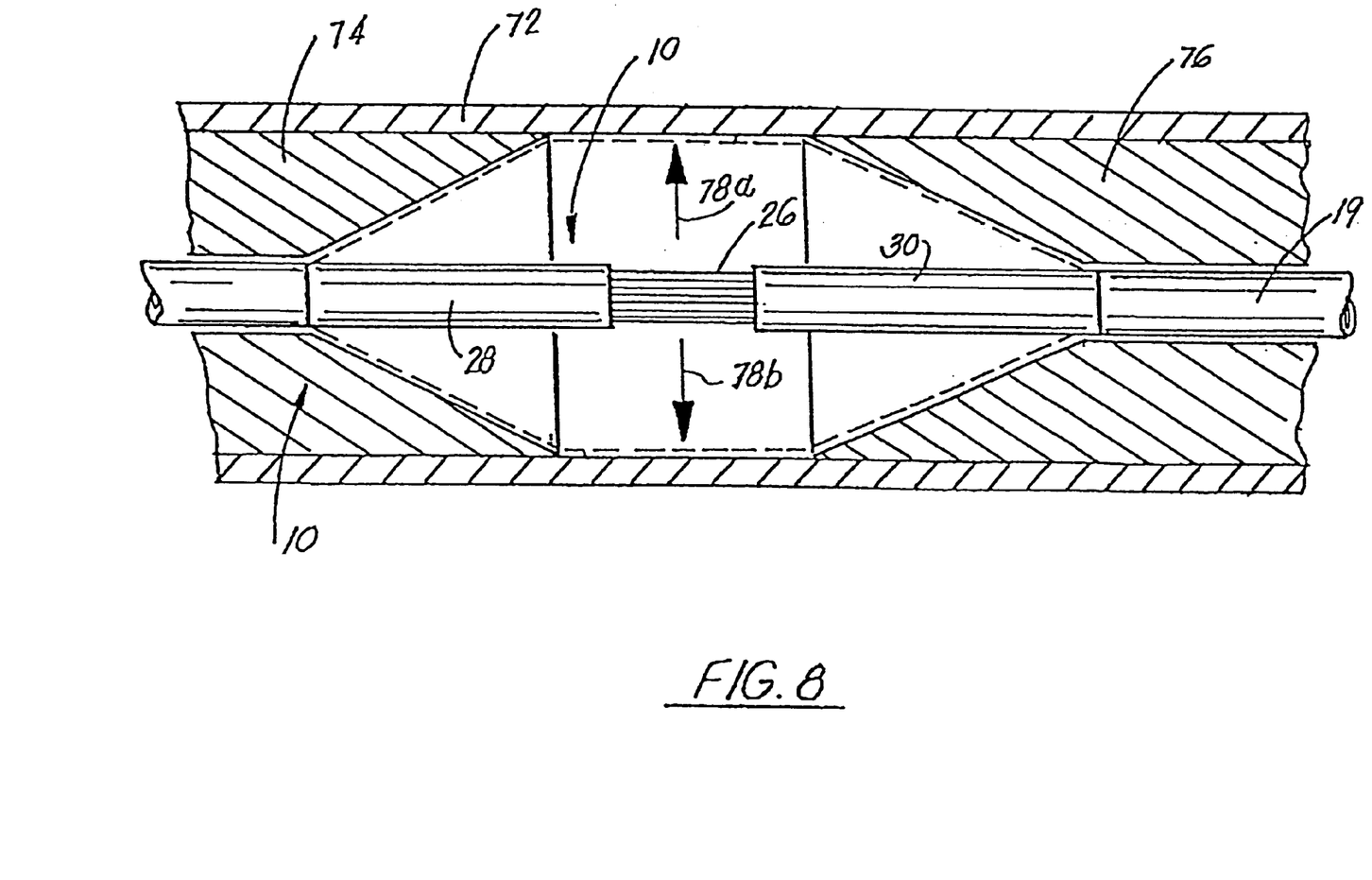
FIG. 8 is a plan view, partially in section, of an inflation element of the type shown in FIGS. 1 and 2 being predisposed in a shaping tool of the type shown in FIG. 6.
Figure 9:
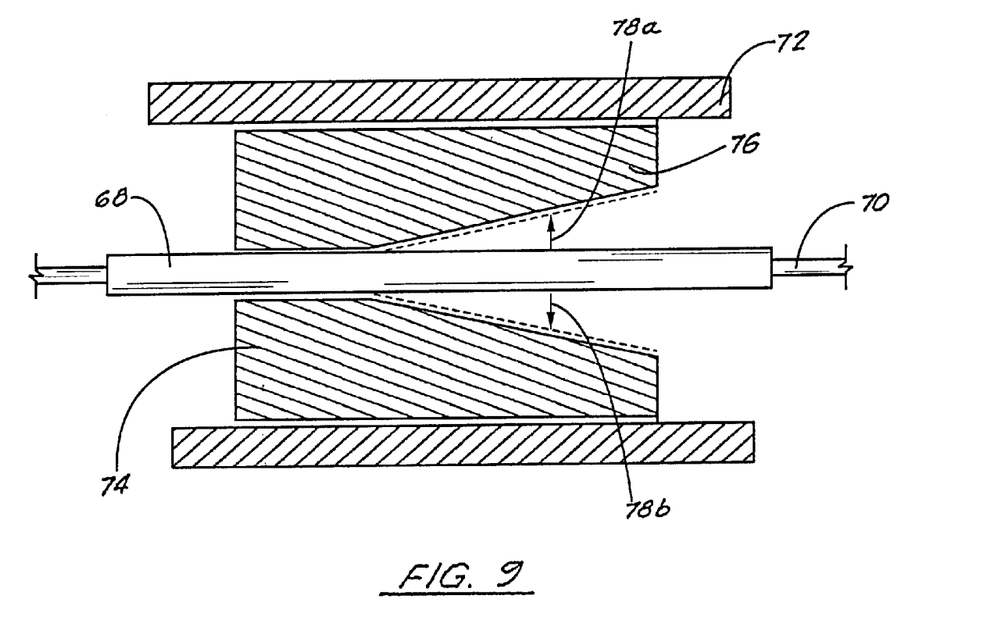
FIG. 9 is a plan view, partially in section, showing a bladder or cover section being predisposed in another embodiment of a shaping tool.

An alternative way for pre-disposing both the bladder and the elastomeric cover sections for an inflation elements is shown in FIG. 8 where the inflation element 10 of FIGS. 1 and 2 has been inserted in a vessel 72 of the type shown in FIG. 6. The tool shown in FIG. 9 includes an alternative embodiment with single truncated conical tapers. The tool 10 is expanded in the direction of arrows 78a, 78b, to where it achieves the expansion profile shown by the dotted lines in FIG. 8. By expanding the tool 10 in this manner, both the bladder (not shown) and the expandable cover section 28, 30, will be pre-disposed in the manner described above. The tool 10 can then be deflated, and run downhole to be expanded as part of its normal operation. In this way, by expanding the cover sections 28, 30, a more predictable expansion profile and a reduced departure angle as the tool expands will be provided. This has been found to have the unexpected results of preventing bending or kinking in the exposed rigs, and reducing the possibility of the bladder catching between the kink rigs and being cut.

Thus, a method has been provided in accordance with the invention, and a shaping tool or vessel formed in accordance with the method, where the expansion profile of a downhole inflation element is pre-disposed. This pre-disposition, as discussed above, tends to make the bladder more resistant against folding and pinching, as well as providing a more uniform expansion along the length of the inflation element for enhanced performance.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as not departing from the spirit of the described invention and falling within the scope of the appended claims.

I claim:

1. A method for pre-disposing the expansion profile in an expandable, elastomeric component of a downhole tool, comprising the steps of:
    (a) selecting a desired expansion profile in an expandable, elastomeric component of a downhole tool;
    (b) providing a vessel and defining a varying inner diameter of the vessel to define a profile for predisposing the expansion profile in the component;
    (c) surrounding at least a portion of the length of the elastomeric component with the vessel;
    (d) applying fluid under pressure to the elastomeric component for expanding it into contact with the inner diameter of the vessel and creating a pre-disposed expansion profile in the component; and
    (e) reducing the pressure of the fluid for allowing the elastomeric component to return generally to its original shape.

2. The method of claim 1, wherein the expandable, elastomeric component comprises a bladder formed of an elastomeric material.

3. The method of claim 1, wherein the expandable, elastomeric component comprises a cover section for an expansion element.

4. The method of claim 1, wherein the expandable, elastomeric component comprises a bladder formed of an elastomeric material, a sheath formed of expandable ribs extending lengthwise along the bladder and overlapping each other, and at least one cover section formed of an elastomeric material covering at least a portion of the outer surface of the ribs.

5. The method of claim 4, and further including the step of combining the ribs and cover with the bladder after the bladder is pre-disposed.

6. The method of claim 1, wherein the inner diameter of the vessel includes a pair of truncated conical tapers that expand outwardly extending toward the middle of the vessel.

7. The method of claim 6, wherein the inner diameter has a cylindrical section located between the truncated conical tapers.

8. The method of claim 6, wherein the inner diameter includes a pair of truncated conical tapers abutting each other.

9. The method of claim 6, wherein the inner diameter is formed of two end caps abutting each other.

10. The method of claim 1, wherein the inner surface of the vessel comprises a single truncated conical taper extending from one end of the vessel to the other.

11. The method of claim 1, wherein the tool comprises a cylindrical sleeve arranged concentrically over the expandable, elastomeric component, and the inner diameter is formed of at least one end cap with a tapered inner surface located between the expandable, elastomeric element and the sleeve.

12. The method of claim 1, wherein the step of surrounding at least a portion of the expandable, elastomeric element comprises the steps of:
    (a) placing a sleeve in a concentric position over the elastomeric element; and
    (b) placing a pair of end caps between the sleeve and elastomeric element for defining the inner diameter of the vessel.

13. The method of claim 1, wherein the step of supplying fluid under pressure comprises supplying fluid under pressure continuously.

14. The method of claim 1, wherein the step of supplying fluid under pressure comprises supplying fluid under pressure intermittently.

15. The method of claim 1, and further including the step of calendering the elastomeric material before the elastomeric component is formed.

16. A downhole tool having an improved expandable, elastomeric component, comprising, an expandable, elastomeric component having a pre-disposed expansion profile, said expansion profile being predisposed by expanding the elastomeric component into contact with a varying inner diameter of a vessel that includes a pair of truncated conical taper sections and allowing the elastomeric component to return to its original shape.

17. The tool of claim 16, wherein the component having a pre-disposed expansion profile includes a bladder for an inflation element.

18. The tool of claim 16, wherein the component having a pre-disposed expansion profile includes a cover section for an inflation element that includes a bladder and a plurality of ribs extending axially over the ribs, and the cover section covering at least a portion of the ribs.

19. The tool of claim 16, and further including:

(a) a pair of end collars:

(b) an inflation element connected between the end collars;

(c) the inflation element having at least one expandable, elastomeric component with a pre-disposed expansion profile.

20. The tool of claim 19, wherein the inflation element includes a bladder, a plurality of expandable ribs extending axially over the surface of the bladder, and a cover section formed of an expandable, elastomeric material covering at least a portion of the ribs, with at least the bladder having a pre-disposed expansion profile.

21. The tool of claim 19, wherein the inflation element includes a bladder, a plurality of expandable ribs extending axially over the surface of the bladder, and a cover section formed of an expandable, elastomeric material covering at least a portion of the ribs, with at least the cover section having a pre-disposed expansion profile.

22. The tool of claim 21, wherein the inflation element includes a plurality of cover sections having pre-disposed expansion profiles.

23. The tool of claim 19, wherein the inflation element has a pre-disposed expansion profile formed by the steps of (a) surrounding the inflation element with a vessel having an inner diameter that defines a profiled limit for pre-disposing the element, and (b) applying fluid under pressure to the inflation element for expanding it into contact with the inner diameter of the vessel and creating a pre-disposed expansion profile in the element before running the inflation element downhole.

24. A vessel for providing a pre-disposed expansion profile in an expandable, elastomeric component of a downhole tool, comprising:

(a) a vessel body shaped and dimensioned to surround at least a portion of the expandable, elastomeric component; and (b) the vessel body including a varying inner diameter, with at least one tapered section, that defines a profiled limit in which the component can be expanded for forming a predetermined pre-disposed expansion profile in the component.

25. The vessel of claim 24, wherein the vessel body includes a sleeve for surrounding the component and a pair of end caps for insertion between the sleeve and component.

26. The vessel of claim 25, wherein the inner surface of the end caps define a pair of truncated conical surfaces separated by a cylindrical section.

27. The vessel of claim 25, wherein the inner surface of the end caps defines a pair of truncated conical surfaces abutting each other.

28. The vessel of claim 24, wherein the expandable, elastomeric component comprises a bladder formed of an elastomeric material.

29. The vessel of claim 24, wherein the expandable, elastomeric component comprises expandable ribs covered at least in part by one or more elastomeric cover sections.

30. The vessel of claim 24, wherein the expandable, elastomeric component comprises a bladder formed of an elastomeric material, a sheath formed of expandable ribs extending lengthwise along the bladder and overlapping each other, and at least one elastomeric cover section covering at least a portion of the ribs.

* * * * *